United States Patent
Garaschenko

(10) Patent No.: US 8,635,500 B2
(45) Date of Patent: Jan. 21, 2014

(54) SYSTEM AND METHOD FOR POWERING REDUNDANT COMPONENTS

(75) Inventor: Dmitri Garaschenko, Ottawa (CA)

(73) Assignee: Alcatel Lucent, Paris (FR)

( * ) Notice: Subject to any disclaimer, the term of this patent is extended or adjusted under 35 U.S.C. 154(b) by 255 days.

(21) Appl. No.: 13/206,243

(22) Filed: Aug. 9, 2011

(65) Prior Publication Data

US 2013/0039481 A1    Feb. 14, 2013

(51) Int. Cl.
*G06F 11/00* (2006.01)

(52) U.S. Cl.
USPC .............. 714/47.1; 714/13; 713/300

(58) Field of Classification Search
USPC .......... 714/4.1, 4.12, 42–44, 47.1, 47.2, 47.3, 714/10–13; 713/300, 320, 323, 330
See application file for complete search history.

(56) References Cited

U.S. PATENT DOCUMENTS

| | | | |
|---|---|---|---|
| 5,925,131 A * | 7/1999 | Novoa et al. ................. | 713/300 |
| 5,940,335 A | 8/1999 | Kirihata | |
| 7,196,661 B2 | 3/2007 | Harvey | |
| 7,216,244 B2 | 5/2007 | Amano | |
| 7,310,737 B2 * | 12/2007 | Patel et al. ................. | 713/300 |
| 2002/0157030 A1 * | 10/2002 | Barker et al. ................. | 713/320 |
| 2004/0054938 A1 | 3/2004 | Belady et al. | |
| 2007/0201426 A1 * | 8/2007 | Shinohara et al. ........... | 370/351 |
| 2008/0010435 A1 * | 1/2008 | Smith et al. ................. | 712/10 |
| 2008/0104430 A1 * | 5/2008 | Malone et al. ............... | 713/300 |
| 2010/0064154 A1 | 3/2010 | King | |
| 2010/0162037 A1 * | 6/2010 | Maule et al. ................. | 714/5 |
| 2012/0151248 A1 * | 6/2012 | Bower et al. ................ | 714/4.11 |

OTHER PUBLICATIONS

International Search Report dated Jul. 19, 2012 for PCT/CA2012/050492.

* cited by examiner

*Primary Examiner* — Scott Baderman
*Assistant Examiner* — Joseph Kudirka
(74) *Attorney, Agent, or Firm* — Kramer & Amado P.C.

(57) ABSTRACT

Various exemplary embodiments relate to a telecom system. The telecom system may include at least one actively operating telecom component and at least one redundant telecom component. The redundant telecom component may be placed in a low power state based upon a first criteria, and in a high power state based upon a second criteria.

18 Claims, 2 Drawing Sheets

SYSTEM AND METHOD FOR POWERING REDUNDANT COMPONENTS

TECHNICAL FIELD

Various exemplary embodiments disclosed herein relate generally to high reliability systems with redundant components.

BACKGROUND

Telecom systems may be designed to provide certain availability, for example "five nines" or 99.999% availability. Some telecom system components may be duplicated for redundancy, as a single component failure may result in the entire telecom system going down. Components whose failure may impact the entire telecom system include, for example, control cards, power supplies, cooling units, and uplinks. These components may be duplicated for redundancy, thus increasing the system's availability. Line cards may be used for line and link protection and may be duplicated for redundancy as well; however, failure of line cards (depending on configuration) may not impact the entire telecom system.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a telecom system, including: at least one actively operating telecom component; and at least one redundant telecom component, wherein the redundant telecom component is placed in a low power state based upon a first criteria, and wherein the redundant telecom component is placed in a high power state based upon a second criteria.

In some embodiments, the second criteria is a change in at least one of static information, dynamic information, routing table information, and level protocol information in the telecom system, and the first criteria is a successful update of at least one of static information, dynamic information, routing table information, and level protocol information in the redundant telecom component. In some embodiments, the redundant telecom component is placed in a high power state at configurable time intervals, and the redundant control card checks for changes to at least one of static information, dynamic information, routing table information, and level protocol information in the telecom system while in the high power state. In some embodiments, the first criteria is a first time of day, and the second criteria is a second time of day different from the first time of day. In some embodiments, the first time of day is a low traffic time period, and the second time of day is a high traffic time period. In some embodiments, the first criteria is a traffic load below a first configurable threshold, and the second criteria is a traffic load above a second configurable threshold. In some embodiments, the second criteria is a change in at least one of a system configuration, a network configuration, a system component, a network topology, and a system power source. In some embodiments, the second criteria is an anticipated failure of at least one actively operating telecom component. In some embodiments, the failure of at least one actively operating telecom component is anticipated based upon at least one actively operating telecom component causing a number of errors beyond a configurable threshold. In some embodiments, the telecom system further includes a network manager configured to place the redundant telecom component in a power state based upon a desired telecom system power level.

Various exemplary embodiments further relate to a method for powering components in a telecom system, including: placing a redundant telecom component in a low power state based upon a first criteria, and placing the redundant telecom component in a high power state based upon a second criteria.

In some embodiments, the second criteria is a change in at least one of static information, dynamic information, routing table information, and level protocol information in the telecom system, and the first criteria is a successful update of at least one of static information, dynamic information, routing table information, and level protocol information in the redundant telecom component. In some embodiments, method of further includes placing the redundant telecom component in a high power state at configurable time intervals; and checking for changes to at least one of static information, dynamic information, routing table information, and level protocol information in the telecom system while in the high power state. In some embodiments, the first criteria is a first time of day, and the second criteria is a second time of day different from the first time of day. In some embodiments, the first time of day is a low traffic time period, and the second time of day is a high traffic time period. In some embodiments, the first criteria is a traffic load below a first configurable threshold, and the second criteria is a traffic load above a second configurable threshold. In some embodiments, the second criteria is a change in at least one of a system configuration, a network configuration, a system component, a network topology, and a system power source. In some embodiments, the second criteria is an anticipated failure of at least one actively operating telecom component, and the failure of at least one actively operating telecom component is anticipated based upon at least one actively operating telecom component causing a number of errors beyond a configurable threshold. In some embodiments, the method further includes obtaining, by a network manager, power profile and other operating information for the redundant component, wherein the network manager places the redundant component in a power state by setting the first and second criterion. In some embodiments, the network manager places a plurality of redundant components in individual power states based upon power profile and other operating information for the redundant components and a desired telecom system power level.

BRIEF DESCRIPTION OF THE DRAWINGS

In order to better understand various exemplary embodiments, reference is made to the accompanying drawings, wherein.

DETAILED DESCRIPTION

Figure 1:
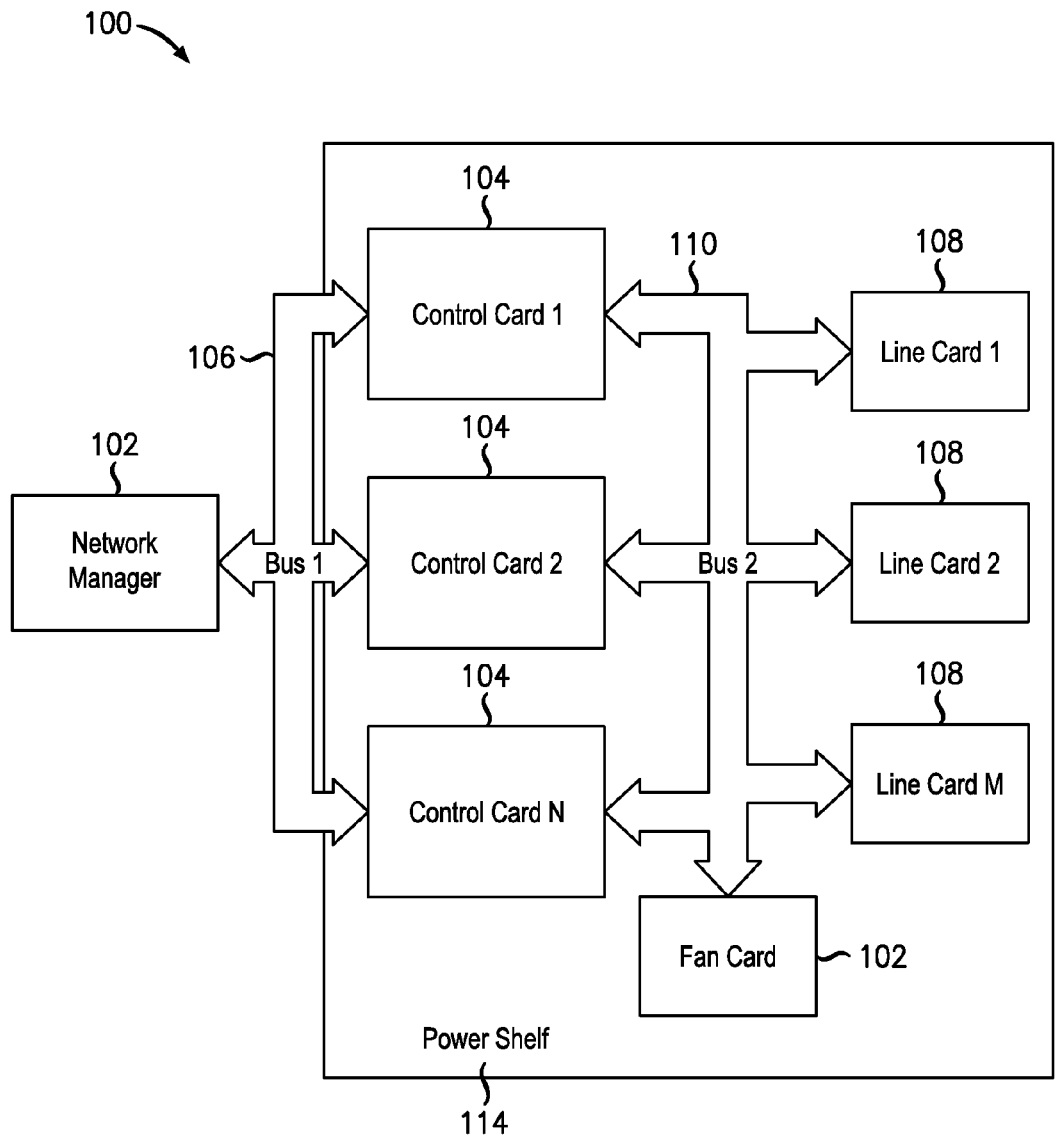
FIG. 1 illustrates an exemplary telecom system according to an embodiment of the present invention.

Referring now to the drawings, there are disclosed broad aspects of various exemplary embodiments.

Power savings in redundant telecom components is described below, however the concept may be applied to other redundant components and systems.

In conventional telecom systems, redundant components may assist in providing a required availability. This may be achieved by keeping both redundant components powered, while only one of the redundant components may be actively operating in the system. Therefore, in case the actively operating component fails, the redundant component may take over active operations quickly. However, in conventional implementations, all of the redundant components may consume their normal power in order to provide fast or hitless recovery. Hitless or virtually hitless is defined as redundancy which may provide protection of all telecom services; however, some packets may be dropped during switchover, as well as communication sessions which are being established and not yet synchronized among the components may be dropped. In some embodiments of the present invention, redundant components may be placed in a low power state. Significant power savings may be realized compared to conventional implementations. Embodiments of the present invention may be combined with other power saving techniques, as described in application Ser. No. 13/206,151, U.S. Patent Application Publication Number 2013/0039443, filed on Aug. 9, 2011 and application Ser. No. 13/206,291, U.S. Patent Application Publication Number 2013/0042125, filed on Aug. 9, 2011, incorporated by reference herein.

FIG. 1 illustrates an exemplary telecom system 100 according to an embodiment of the present invention. The telecom system 100 may include a network manager 102. The network manager 102 may manage components in the telecom system 100. The network manager 102 may be connected to 2-N redundant control cards 104 via a first bus 106. The first bus 106 may be, for example, an Ethernet bus or other signal transmitting medium. The 2-N redundant control cards 104 may include two or more control cards. Each of the 2-N redundant control cards 104 may be connected to 1-M line cards 108 via a second bus 110. The second bus 110 may be, for example, an I2C bus or other signal transmitting medium. The second bus 110 may also connect each of the 2-N redundant control cards 104 to at least one fan card 112. The 2-N redundant control cards 104, the 1-M line cards 108, and the fan card 112 may receive power from a power shelf 114. The telecom system 100 may include additional redundant components, as well as additional management software and hardware.

The power shelf 114 may provide full power, partial power, or minimal power to each of the redundant components in the telecom system 100. When a redundant component is receiving full power, it may be in a "hot" state. When in a "hot" state, the redundant component may provide hitless redundancy with minimal service disruption in case another component fails. When a component is receiving partial or minimal power, it may be in a "cold" state. When in a "cold" state, the redundant component may receive some power, but may not process data or perform certain other functions. If another component fails, a redundant component in a "cold" state may take over with a higher service disruption than a redundant component in a "hot" state. The "cold" state may result in a longer failure recovery time and may lower the availability of the telecom system 100. However, a redundant component in a "cold" state may consume significantly less power than a redundant component in a "hot" state. Further, there may be network conditions which may be adequately served with the lower availability caused by a redundant component in the "cold" state. Therefore, it may be beneficial to place a redundant component in a "cold" state when certain criteria are met. The redundant component may be restored to a "hot" state when other criteria are met.

Figure 2:
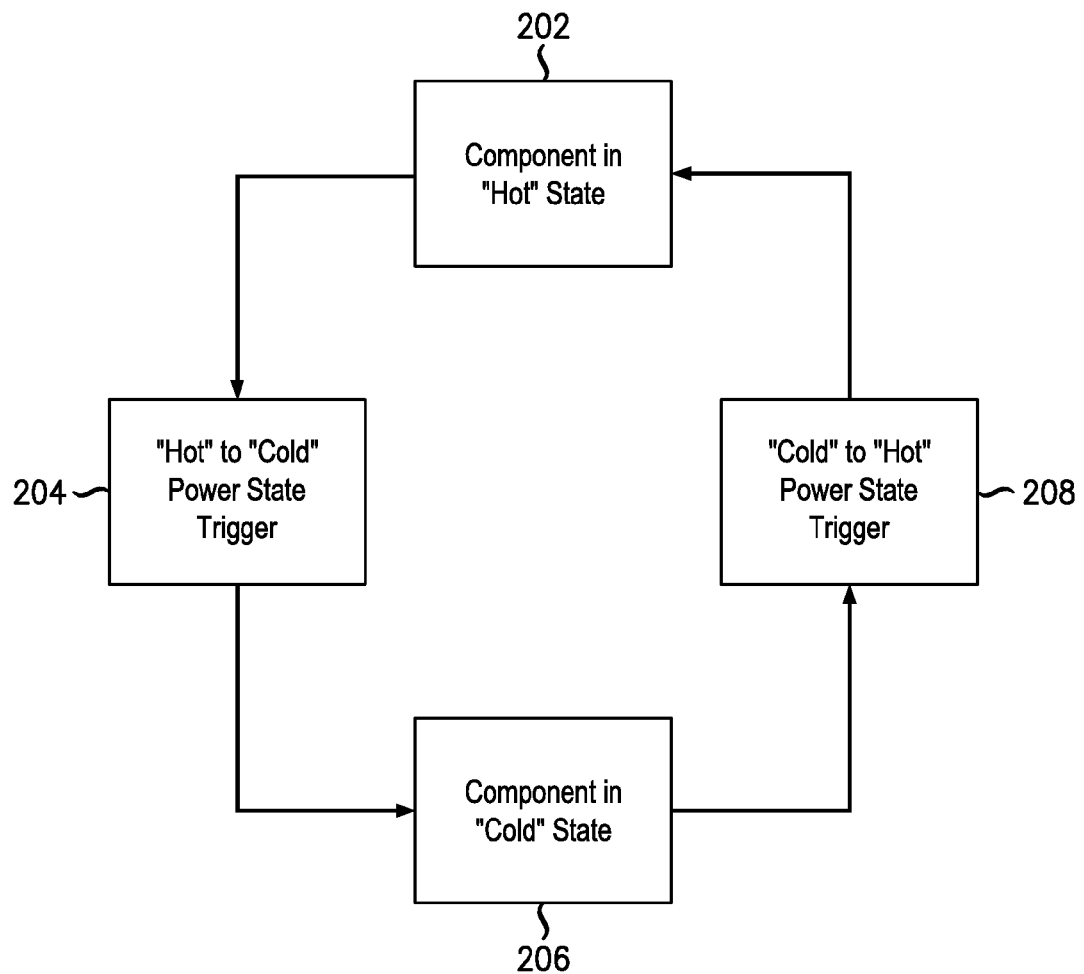
FIG. 2 illustrates exemplary power state transitions according to an embodiment of the present invention.

FIG. 2 illustrates exemplary power state transitions according to an embodiment of the present invention. A component in a "hot" state 202 may transition to a "cold" state 206 upon a "hot" to "cold" trigger event 204 in the telecom system. A component in a "cold" state 206 may transition to a "hot" state 202 upon a "cold" to "hot" trigger event 208.

The trigger events 204 and 208 may be based upon static and/or dynamic configuration changes. Some telecom components, such as, for example control cards, may store static and/or dynamic configuration information. Static and/or dynamic configuration information may include, for example routing table information and L1, L2, and L3 level protocol information. When a change in static and/or dynamic configuration information occurs, a redundant component in a "cold" power state 206 may be placed in a "hot" power state 202. While in the "hot" power state 202, the redundant component may have its configuration information updated so that the interruption time during a switchover may be minimized. After the static and/or dynamic configuration information is updated, the redundant component may be placed back in a "cold" power state 206. The redundant component may remain in the "cold" power state 206 until another change in static and/or dynamic information occurs, another trigger event occurs, and/or an actively operating component fails.

Alternatively or in addition, the redundant component may update state and/or dynamic configuration information on a periodic schedule. A redundant component in a "cold" power state 206 may be placed in a "hot" power state 202 at configurable time intervals (e.g. every 10, 20, 30, 60, or 120 minutes). While in the "hot" power state 202, the redundant component may check for changes in the static and/or dynamic configuration information, and if necessary, the redundant component may update its static and/or dynamic configuration information. After the static and/or dynamic configuration information is updated, or if no update is necessary, the redundant component may be placed back in a "cold" power state 206. The redundant component may remain in the "cold" power state 206 until the next configurable interval, another trigger event occurs, and/or an actively operating component fails.

Alternatively or in addition, a redundant component may be placed in a "cold" power state 206 at configurable times of the day, and in a "hot" power state 202 at other times of the day. A telecom system may experience lower traffic at certain hours (e.g., at night and early morning). A lower level of redundancy may be acceptable during low traffic time periods. Therefore, the redundant components may be placed in a "cold" power state 206 at times that are anticipated to be low traffic time periods. The redundant components may then be placed in a "hot" power state at times that are anticipated to be high traffic time periods. Further, some telecom systems may operate with solar power during daylight and with batteries at night. Therefore, placing redundant components in a "cold" power state 206 at night may allow the telecom system to operate more effectively on battery power. The redundant component may remain in the "cold" power state 206 until the next configurable time period, another trigger event occurs, and/or an actively operating component fails.

Alternatively or in addition, the trigger events 204 and 208 may be determined by traffic processing load. When the traffic load in the telecom system increases beyond a configurable threshold, a redundant component in a "cold" power state 206 may be placed in a "hot" power state. Similarly, when the traffic load in the telecom system decreases below a configurable threshold, the redundant component may return to the "cold" power state. The redundant component may remain in the "cold" power state 206 until the traffic load increases beyond the configurable threshold, another trigger event occurs, and/or an actively operating component fails. The traffic load may be determined by, for example, a number of active connections, processor loading, memory loading, and/or other measurable criteria. The trigger events 204 and 208 may include additional mechanisms to avoid frequent triggers when the traffic load is near the threshold, such as, for example delay timers, induced lag, moving averages, and/or other mechanisms.

Alternatively or in addition, the trigger events 204 and 208 may be determined by system and/or network configuration changes. If a system and/or network change occurs, then a redundant component in a "cold" power state 206 may be placed in a "hot" power state 202. While in the "hot" power state 202, the redundant component may update itself with the changes to the system and/or network. After updating, the redundant component may return to the "cold" power state 206. The redundant component may remain in the "cold" power state 206 until another system and/or network configuration change, another trigger event occurs, and/or an actively operating component fails. A system and/or network configuration change may include, for example, adding/removing system components, changing a network topology, and/or changing the system's power source (e.g., switching from solar to battery).

Alternatively or in addition, the trigger events 204 and 208 may be determined by errors in other system components. If an actively operating component causes a number of errors beyond a configurable threshold, then a redundant component in a "cold" power state 206 may be placed in a "hot" power state 202 in anticipation of the actively operating component failing. The errors may be, for example, traffic errors, diagnostic errors, and/or other errors. The redundant component may remain in the "hot" power state until the number of errors is reset and/or the actively operating component is replaced.

The power shelf 114, network manager 102, and other telecom system components may include hardware and software to implement the "hot" and "cold" power states. The network manager 102 may analyze the components in the system 100 to determine redundant components. Once any redundant components are identified, the network manager 102 may obtain power profile and other operating information for each of the redundant components. A user may configure the the power shelf 114, network manager 102, and other telecom system components to provide a desired level of redundancy and a desired level of power usage. The network manager may reduce the power used by the system to meet the desired level of power usage based upon the power profile and other operating information for each of the redundant components. The "hot" and "cold" power states may be applied to redundant circuitries, redundant packs, and/or entire redundant systems.

It should be apparent from the foregoing description that various exemplary embodiments of the invention may be implemented in hardware and/or firmware. Furthermore, various exemplary embodiments may be implemented as instructions stored on a non-transitory machine-readable storage medium, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A telecom system, comprising:
at least one actively operating telecom component; and
at least one redundant telecom component,
wherein the redundant telecom component is placed in a high power state based on a first criterion comprising an indication of a change in configuration information used to perform an update of the redundant telecom component while the redundant telecom component is in the high power state, and
wherein the redundant telecom component is placed in a low power state based upon a second criterion comprising completion of the update.

2. The telecom system of claim 1, wherein the redundant telecom component is placed in a high power state at configurable time intervals, and
wherein the redundant telecom component checks for changes to at least one of static information, dynamic information, routing table information, and level protocol information in the telecom system while in the high power state.

3. The telecom system of claim 1, wherein the redundant telecom component is placed in the low power state based on a third criterion comprising a first time of day, and
wherein the redundant telecom component is placed in the high power state based on a fourth criterion comprising a second time of day different from the first time of day.

4. The telecom system of claim 3, wherein the first time of day is a low traffic time period, and
wherein the second time of day is a high traffic time period.

5. The telecom system of claim 1, wherein the redundant telecom component is placed in the low power state based on a third criterion comprising a traffic load below a first configurable threshold, and
wherein the redundant telecom component is placed in the high power state based on a fourth criterion comprising a traffic load above a second configurable threshold.

6. The telecom system of claim 1, wherein the redundant telecom component is placed in the high power state based on a third criterion comprising a change in at least one of a system configuration, a network configuration, a system component, a network topology, and a system power source.

7. The telecom system of claim 1, wherein the redundant telecom component is placed in the high power state based on a third criterion comprising an anticipated failure of at least one actively operating telecom component.

8. The telecom system of claim 7, wherein the failure of at least one actively operating telecom component is anticipated based upon at least one actively operating telecom component causing a number of errors beyond a configurable threshold.

9. The telecom system of claim 1, further comprising:
a network manager configured to place the redundant telecom component in a power state based upon a desired telecom system power level.

10. A method for powering components in a telecom system, comprising:
placing a redundant telecom component in a high power state based upon a first criterion comprising an indication of a change in configuration information used to perform an update of the redundant telecom component while the redundant telecom component is in the high power state, and
placing the redundant telecom component in a low power state based upon a second criterion comprising completion of the update.

11. The method of claim 10, further comprising:
placing the redundant telecom component in a high power state at configurable time intervals; and
checking for changes to at least one of static information, dynamic information, routing table information, and level protocol information in the telecom system while in the high power state.

12. The method of claim 10, further comprising:
placing the redundant telecom component in the low power state based on a third criterion comprising a first time of day, and
placing the redundant telecom component in the high power state based on a fourth criterion comprising a second time of day different from the first time of day.

13. The method of claim 12, wherein the first time of day is a low traffic time period, and
wherein the second time of day is a high traffic time period.

14. The method of claim 10, further comprising:
placing the redundant telecom component in the low power state based on a third criterion comprising a traffic load below a first configurable threshold, and
placing the redundant telecom component in the high power state based on a fourth criterion comprising a traffic load above a second configurable threshold.

15. The method of claim 10, further comprising placing the redundant telecom component in the high power state based on a third criterion comprising a change in at least one of a system configuration, a network configuration, a system component, a network topology, and a system power source.

16. The method of claim 10, further comprising placing the redundant telecom component in the high power state based on a third criterion comprising an anticipated failure of at least one actively operating telecom component, and
wherein the failure of at least one actively operating telecom component is anticipated based upon at least one actively operating telecom component causing a number of errors beyond a configurable threshold.

17. The method of claim 10, further comprising:
obtaining, by a network manager, a power profile and other operating information for the redundant component,
wherein the network manager places the redundant component in a power state by setting the first criterion and the second criterion.

18. The method of claim 17, wherein the network manager places a plurality of redundant components in individual power states based upon the power profile, other operating information for the redundant components, and a desired telecom system power level.

* * * * *